(12) United States Patent
Yang

(10) Patent No.: US 11,632,376 B2
(45) Date of Patent: Apr. 18, 2023

(54) NETWORK RESOURCE ACCESS SYSTEM AND METHOD, USER PORTAL AND RESOURCE PORTAL

(71) Applicant: Hangzhou Jindoutengyun Technologies Co., Ltd., Hangzhou (CN)

(72) Inventor: Yang Yang, Hangzhou (CN)

(73) Assignee: Hangzhou Jindoutengyun Technologies Co., Ltd., Hangzhou (CN)

( * ) Notice: Subject to any disclaimer, the term of this patent is extended or adjusted under 35 U.S.C. 154(b) by 0 days.

(21) Appl. No.: 17/524,763

(22) Filed: Nov. 12, 2021

(65) Prior Publication Data
US 2022/0182389 A1    Jun. 9, 2022

(30) Foreign Application Priority Data
Dec. 7, 2020    (CN) .......................... 202011413775.3

(51) Int. Cl.
*H04L 9/40* (2022.01)
*H04L 67/60* (2022.01)

(52) U.S. Cl.
CPC .......... *H04L 63/102* (2013.01); *H04L 63/101* (2013.01); *H04L 63/1416* (2013.01); *H04L 63/1425* (2013.01); *H04L 63/20* (2013.01)

(58) Field of Classification Search
CPC . H04L 63/102; H04L 63/101; H04L 63/1416; H04L 63/1425; H04L 63/20;
(Continued)

(56) References Cited

U.S. PATENT DOCUMENTS 10,742,659 B1 *  8/2020  Roka .................. H04L 63/0884
2014/0298423 A1 * 10/2014  Moloian ............... G06F 16/283
                                                            726/4
(Continued)

FOREIGN PATENT DOCUMENTS

CN           1909685 A      2/2007
CN         101924634 A     12/2010
(Continued)

OTHER PUBLICATIONS

Konstantinov et al., "The model of management access to the resources of the closed discretionary information computation environment in the form of corporate portal network," 2016 IEEE 10th International Conference on Application of Information and Communication Technologies (AICT) Year: 2016 | Conference Paper.*

(Continued)

*Primary Examiner* — Roderick Tolentino
(74) *Attorney, Agent, or Firm* — PROI Intellectual Property US; Klaus Michael Schmid

(57) ABSTRACT

The invention relates to the technical field of network security, in particular to a network resource access system and method, a user portal, and a resource portal to isolate users from network resources to reduce unnecessary information disclosure, thus reducing security risks. According to the technical solution, the resource portal acquires resource information associated with the resource portal according to a configuration from an administrator or from a third party, as well as a list of user portals capable of communicating with the resource portal, receives a second access request sent from a user portal in the list of user portals, generates a third access request according to the second access request, and then sends the third access request to a target network resource server.

9 Claims, 8 Drawing Sheets

(58) Field of Classification Search
CPC .......... H04L 67/1097; H04L 67/1002; H04W 88/08; H04W 88/16; H04W 52/0251
See application file for complete search history.

(56) References Cited

U.S. PATENT DOCUMENTS

| | | | |
|---|---|---|---|
| 2016/0182402 A1* | 6/2016 | Carames | H04L 47/808 709/225 |
| 2018/0309756 A1* | 10/2018 | Chen | G06F 21/41 |
| 2019/0082482 A1* | 3/2019 | Chen | H04W 72/04 |
| 2019/0089810 A1* | 3/2019 | Wu | G06F 9/5005 |
| 2019/0281057 A1* | 9/2019 | McAninch | G06F 9/45558 |
| 2019/0342229 A1* | 11/2019 | Khinvasara | H04L 41/0895 |
| 2020/0089887 A1* | 3/2020 | Luthra | G06F 21/552 |
| 2020/0125618 A1* | 4/2020 | Yang | G06F 16/9537 |
| 2020/0162255 A1* | 5/2020 | Hunt | H04L 63/083 |

FOREIGN PATENT DOCUMENTS

| | | |
|---|---|---|
| CN | 104823175 A | 8/2015 |
| CN | 106105139 A | 11/2016 |
| CN | 106209838 A | 12/2016 |
| CN | 107005542 A | 8/2017 |
| KR | 20150073784 A | 7/2015 |

OTHER PUBLICATIONS

Terzieva et al., "Learning Analytics—Need of Centralized Portal for Access to E-Learning Resources," 2019 Big Data, Knowledge and Control Systems Engineering (BdKCSE) Year: 2019 | Conference Paper | Publisher: IEEE.*

Huang Guanhua. Portal-based Multi-tenant Information Portal Platform Research and Implementation of the China Outstanding Master's Thesis Full Text Data Library Information Technology Series (Monthly).2014.

* cited by examiner

NETWORK RESOURCE ACCESS SYSTEM AND METHOD, USER PORTAL AND RESOURCE PORTAL

BACKGROUND OF THE INVENTION

1. Technical Field

The invention relates to the technical field of network security, in particular to a network resource access system and method, a user portal and a resource portal.

2. Description of Related Art

In existing network architectures, network applications are exposed to users, so users can directly access the network applications, which may cause the following problems during access to the network applications:

a. Requests sent to network applications by users cannot be effectively checked and managed, so defects/bugs in the network applications may be maliciously exploited, resulting in data leakages or business losses;

b. Information returned to users by network applications cannot be effectively checked and managed, which in turn leads to leakages of business data and further results in penetrations and attacks on other business-related systems;

c. Users can acquire specific information of network applications, including components, business logic and specific contents of the network applications; attackers can collect and use these information to penetrate and attack the network applications, thus leading to leakages of application-related data and business losses, further resulting in filtrations and attacks on other business-related systems, and even causing overall destruction;

d. Personal information and privacy of users may be collected by network applications for malicious purposes, and malicious contents in the network applications may do harm to users.

BRIEF SUMMARY OF THE INVENTION

The objective of the invention is to solve the above-mentioned problems by providing a network resource access system and method to isolate users from network resources to reduce unnecessary information disclosure and security risks.

To fulfill the above objective, the invention adopts the following technical solution:

A network resource access system comprises a user portal and a resource portal that are in a communication connection, wherein:

The user portal acquires a list of resource portals, capable of communicating with the user portal, according to a configuration from an administrator or from a third party, uses a resource list associated with resource portals as an accessible resource list, and is used for receiving a first access request initiated by a user by means of a user terminal and aiming at a target network resource in the accessible resource list, generating a second access request according to the first access request, and then sending the second access request to the resource portal;

The resource portal acquires resource information associated with the resource portal according to a configuration from an administrator or from a third party, as well as a list of user portals capable of communicating with the resource portal, and is used for receiving a second access request sent from a user portal in the list of user portals, generating a third access request according to the second access request, and then sending the third access request to a target network resource server.

Preferably, the resource portal is also used for receiving a first response to the third access request returned by the target network resource server, generating a second response to the second access request according to the first response, and sending the second response to the user portal;

The user portal is also used for receiving the second response returned by the resource portal, generating a third response to the first access request according to the second response, and sending the third response to the user terminal.

Preferably, receiving a first access request and generating a second access request according to the first access request, specifically comprise:

Receiving the first access request, and acquiring first access request information; determining a resource portal and route information corresponding to the target network resource corresponding to the first access request according to a first corresponding relationship determined by configurations embedded in the system, from a local administrator or from a third-party, and converting the first access request information according to the determined information to generate second access request information; and generating the second access request according to the second access request information.

Preferably, receiving a first access request and generating a second access request according to the first access request, specifically comprise: receiving the first access request, and acquiring first access request information; checking the validity of the first access request information, and discarding illegal request information from the first access request information; determining a resource portal and route information corresponding to the target network resource corresponding to the first access request according to a first corresponding relationship determined by configurations embedded in the system, from a local administrator or from a third-party, and converting access request information, obtained after the illegal request information is discarded, according to the determined information to generate second request access information; and generating the second access request according to the second access request information.

Preferably, receiving a first access request and generating a second access request according to the first access request, specifically comprise: receiving the first access request, and acquiring first access request information; discarding access request information beyond user permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user permissions is discarded, according to the determined information to generate second access request information; and generating the second access request according to the second access request information.

Preferably, receiving a first access request and generating a second access request according to the first access request, specifically comprise: receiving the first access request, and acquiring first access request information; discarding access request information beyond user portal permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user portal permissions is discarded, according to the determined information to generate second access request information; and generating the second access request according to the second access request information.

Preferably, receiving a first access request and generating a second access request according to the first access request, specifically comprise: receiving the first access request, and acquiring first access request information; filtering contents harmful to the resource portal or the target network resource or contents of sensitive or confidential information out of the first access request information, then determining a resource portal and route information corresponding to the target network resource corresponding to the first access request according to a first corresponding relationship determined by configurations embedded in the system, from a local administrator or from a third-party, and converting filtered access request information according to the determined information to generate second access request information; and generating the second access request according to the second access request information.

Preferably, receiving a second access request and generating a third access request according to the second access request, specifically comprise:

Receiving the second access request, and acquiring second access request information; determining one or more contents of an actual address, a request method and a processing logic of the target network resource corresponding to the second access request according to a second corresponding relationship determined by configurations embedded in the system, from a local administrator or from a third-party, and converting the second access request information according to the determined one or more contents to generate third access request information; and generating the third access request according to the third access request information.

Preferably, receiving a second access request and generating a third access request according to the second access request, specifically comprise: receiving the second access request, and acquiring second access request information; discarding access request information beyond user portal permissions from the second access request information, then determining one or more contents of an actual address, a request method and a processing logic of the target network resource corresponding to the second access request according to a second corresponding relationship determined by configurations embedded in the system, from a local administrator or from a third-party, and converting access request information, obtained after the access request information beyond the user portal permissions are discharged, according to the determined one or more contents to generate third access request information; and generating the third access request according to the third access request information.

Preferably, receiving a second access request and generating a third access request according to the second access request, specifically comprise: receiving the second access request, and acquiring second access request information; filtering contents harmful to the resource portal or the target network resource or contents of sensitive or confidential information out of the second access request information, then determining one or more contents of an actual address, a request method and a processing logic of the target network resource corresponding to the second access request according to a second corresponding relationship determined by configurations embedded in the system, from a local administrator or from a third-party, and converting filtered access request information according to the determined one or more contents to generate third access request information; and generating the third access request according to the third access request information.

Preferably, receiving a first response and generating a second response according to the first response, specifically comprise:

Receiving the first response, and acquiring first response information; determining route information of a user portal corresponding to the first response according to a reverse route transmitted by the second access request; generating second response information according to contents of the first response information, and the route information; and generating the second response according to the second response information.

Preferably, receiving a first response and generating a second response according to the first response, specifically comprise: receiving the first response, and acquiring first response information; converting the first response information to generate information of an image code format as contents of second response information; determining route information of the user portal corresponding to the first response according to a reverse route transmitted by the second access request; generating the second response information according to the contents of the second response information, and the route information; and generating the second response according to the second response information.

Preferably, receiving a first response and generating a second response according to the first response, specifically comprise: receiving the first response, and acquiring first response information; filtering contents harmful to the user portal or contents of sensitive or confidential information out of the first response information, and then converting filtered response information to generate information of an image code forma as contents of second response information; determining route information of the user portal corresponding to the first response according to a reverse route transmitted by the second access request; generating the second response information according to the contents of the second response information, and the route information; and generating the second response according to the second response information.

Preferably, receiving a first response and generating a second response according to the first response, specifically comprise: receiving the first response, and acquiring first response information; checking the validity of the first response information, and discarding illegal response information from the first response information; converting information, obtained after the illegal response information is discarded, to generate information of an image code format as contents of second response information; determining route information of the user portal corresponding to the first response according to a reverse route transmitted by the second access request; generating the second response information according to the contents of the second response information, and the route information; and generating the second response according to the second response information.

Preferably, the conversion specifically comprises: presenting the first response information by means of a corresponding presentation tool according to the type of the target network resource or the data type and contents of the first response information, and generating the information of the image code format by projection or drawing according to presented contents.

Preferably, the conversion specifically comprises: presenting the filtered response information by means of a corresponding presentation tool according to the type of the target network resource or the data type and contents of the first response information, and generating the information of the image code format by projection or drawing according to presented contents.

Preferably, the conversion specifically comprises: presenting the information, obtained after the illegal response information is discarded, by means of a corresponding presentation tool according to the type of the target network resource or the data type and contents of the first response information, and generating the information of the image code format by projection or drawing according to presented contents.

Preferably, receiving a second response and generating a third response according to the second response, specifically comprise:

Receiving the second response, and acquiring second response information; determining route information of the user terminal corresponding to the second response according to a reverse route transmitted by the first access request; generating third response information according to contents of the second response information, and the route information; and generating the third response according to the third response information.

Preferably, receiving a second response and generating a third response according to the second response, specifically comprise: receiving the second response, and acquiring second response information; filtering contents harmful to the user terminal or contents of sensitive or confidential information out of the second response information, and then determining route information of the user terminal corresponding to the second response according to a reverse route transmitted by the first access request; generating third response information according to contents of filtered response information, and the route information; and generating the third response according to the third response information.

Preferably, receiving a second response and generating a third response according to the second response, specifically comprise: receiving the second response, and acquiring second response information; converting the second response information to generate information of an image code format as contents of third response information; determining route information of the user terminal corresponding to the second response according to a reverse route transmitted by the first access request; generating the third response information according to the contents of the third response information, and the route information; and generating the third response according to the third response information.

Preferably, converting the second response information to generate information of an image code format, specifically comprises:

Presenting the second response information by means of a corresponding presentation tool according to the type of the target network resource or the data type and contents of the first response information, and generating the information of the image code format by projection or drawing according to presented contents.

Preferably,

The user portal sends an access request only to a resource portal capable of establishing a communication connection with the user portal, and determines whether to send the request according to whether the current state of the resource portal is normal;

The user portal sends a response only to a resource portal capable of establishing a communication connection with the user portal, and determines whether to receive the response according to whether the current state of the resource portal is normal;

The resource portal only receives an access request sent from a user portal capable of establishing a communication connection with the resource portal, and determines whether to receive the access request according to whether the current state of the user portal is normal.

The resource portal sends a resource list and/or response only to a user portal capable of establishing a communication connection with the resource portal, and determines whether to send the resource list and/or response according to whether the current state of the user portal is normal;

The user portal is also used for managing user information and verifying user permissions;

The resource portal is also used for managing resource information and monitoring a resource state.

A network resource access processing method is applied to a user portal and comprises:

Acquiring a list of resource portals, capable of communicating with the user portal, according to a configuration from an administrator or from a third party, and using a resource list associated with resource portals as an accessible resource list of the user portal; and Receiving a first access request initiated by a user by means of a user terminal and aiming at a target network resource in the accessible resource list, generating a second access request according to the first access request, and then sending the second access request to a resource portal.

Preferably, the access method further comprises:

Receiving a second response returned by the resource portal, generating a third response to the first access request according to the second response, and sending the third response to the user terminal;

Wherein, the second response is a response to the second access request.

Preferably, receiving a first access request and generating a second access request according to the first access request, specifically comprise:

Receiving the first access request, and acquiring first access request information; determining a resource portal and route information corresponding to the target network resource corresponding to the first access request according to a first corresponding relationship determined by configurations embedded in the system, from a local administrator or from a third-party, and converting the first access request information according to the determined information to generate second access request information; and generating the second access request according to the second access request information;

Preferably, receiving a first access request and generating a second access request according to the first access request, specifically comprise: receiving the first access request, and acquiring first access request information; checking the validity of the first access request information, and discarding illegal request information from the first access request information; determining a resource portal and route information corresponding to the target network resource corresponding to the first access request according to a first corresponding relationship determined by configurations embedded in the system, from a local administrator or from a third-party, and converting access request information, obtained after the illegal request information is discarded, according to the determined information to generate second request access information; and generating the second access request according to the second access request information;

Preferably, receiving a first access request and generating a second access request according to the first access request, specifically comprise: receiving the first access request, and acquiring first access request information; discarding access request information beyond user permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user permissions is discarded, according to the determined information to generate second access request information; and generating the second access request according to the second access request information;

Preferably, receiving a first access request and generating a second access request according to the first access request, specifically comprise: receiving the first access request, and acquiring first access request information; discarding access request information beyond user portal permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user portal permissions is discarded, according to the determined information to generate second access request information; and generating the second access request according to the second access request information;

Preferably, receiving a first access request and generating a second access request according to the first access request, specifically comprise: receiving the first access request, and acquiring first access request information; filtering contents harmful to the resource portal or the target network resource or contents of sensitive or confidential information out of the first access request information, then determining a resource portal and route information corresponding to the target network resource corresponding to the first access request according to a first corresponding relationship determined by configurations embedded in the system, from a local administrator or from a third-party, and converting filtered access request information according to the determined information to generate second access request information; and generating the second access request according to the second access request information.

Preferably, receiving a second response and generating a third response according to the second response, specifically comprise:

Receiving the second response, and acquiring second response information; determining route information of the user terminal corresponding to the second response according to a reverse route transmitted by the first access request; generating third response information according to contents of the second response information, and the route information; and generating the third response according to the third response information;

Preferably, receiving a second response and generating a third response according to the second response, specifically comprise: receiving the second response, and acquiring second response information; filtering contents harmful to the user terminal or contents of sensitive or confidential information out of the second response information, and then determining route information of the user terminal corresponding to the second response according to a reverse route transmitted by the first access request; generating third response information according to contents of filtered response information, and the route information; and generating the third response according to the third response information;

Preferably, receiving a second response and generating a third response according to the second response, specifically comprise: receiving the second response, and acquiring second response information; converting the second response information to generate information of an image code format as contents of third response information; determining route information of the user terminal corresponding to the second response according to a reverse route transmitted by the first access request; generating the third response information according to the contents of the third response information, and the route information; and generating the third response according to the third response information.

Preferably, converting the second response information to generate information of an image code format, specifically comprises:

Presenting the second response information by means of a corresponding presentation tool according to the type of the target network resource or the data type and contents of the first response information, and generating the information of the image code format by projection or drawing according to presented contents.

Preferably, the user portal sends an access request only to a resource portal capable of establishing a communication connection with the user portal, and determines whether to send the request according to whether the current state of the resource portal is normal; the resource portal only receives an access request sent from a user portal capable of establishing a communication connection with the resource portal, and determines whether to receive the access request according to whether the current state of the user portal is normal; and the user portal is also used for managing user information and verifying user permissions.

A user portal comprises a memory and a processor that are in a communication connection, and a computer program stored in the memory and to be run on the processor, wherein when the computer program is run by the processor, the method mentioned above is implemented.

A network resource access processing method is applied to a resource portal and comprises:

Acquiring resource information associated with the resource portal according to a configuration from an administrator or from a third party, as well as a list of user portals capable of communicating with the resource portal, receiving a second access request sent from a user portal in the list of user portals, generating a third access request according to the second access request, and then sending the third access request to a target network resource server.

Preferably, the access method further comprises:

Receiving a first response to the third access request returned by the target network resource server, generating a second response to the second access request according to the first response, and sending the second response to the user portal.

Preferably, the user portal receives a first access request initiated by a user by means of a user terminal and aiming at the target network resource, and generates the second access request according to the first access request.

Preferably, receiving a first access request and generating a second access request according to the first access request, specifically comprise:

Receiving the first access request, and acquiring first access request information; determining a resource portal and route information corresponding to the target network resource corresponding to the first access request according to a first corresponding relationship determined by configurations embedded in the system, from a local administrator or from a third-party, and converting the first access request information according to the determined information to generate second access request information; and generating the second access request according to the second access request information;

Preferably, receiving a first access request and generating a second access request according to the first access request, specifically comprise: receiving the first access request, and acquiring first access request information; checking the validity of the first access request information, and discarding illegal request information from the first access request information; determining a resource portal and route information corresponding to the target network resource corresponding to the first access request according to a first corresponding relationship determined by configurations embedded in the system, from a local administrator or from a third-party, and converting access request information, obtained after the illegal request information is discarded, according to the determined information to generate second request access information; and generating the second access request according to the second access request information;

Preferably, receiving a first access request and generating a second access request according to the first access request, specifically comprise: receiving the first access request, and acquiring first access request information; discarding access request information beyond user permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user permissions is discarded, according to the determined information to generate second access request information; and generating the second access request according to the second access request information;

Preferably, receiving a first access request and generating a second access request according to the first access request, specifically comprise: receiving the first access request, and acquiring first access request information; discarding access request information beyond user portal permissions from the first access request information, then determining a resource portal and route information corresponding to the target network resource corresponding to the first access request according to a first corresponding relationship determined by configurations embedded in the system, from a local administrator or from a third-party, and converting access request information, obtained after the access request information beyond the user portal permissions is discarded, according to the determined information to generate second access request information; and generating the second access request according to the second access request information;

Preferably, receiving a first access request and generating a second access request according to the first access request, specifically comprise: receiving the first access request, and acquiring first access request information; filtering contents harmful to the resource portal or the target network resource or contents of sensitive or confidential information out of the first access request information, then determining a resource portal and route information corresponding to the target network resource corresponding to the first access request according to a first corresponding relationship determined by configurations embedded in the system, from a local administrator or from a third-party, and converting filtered access request information according to the determined information to generate second access request information; and generating the second access request according to the second access request information.

Preferably, receiving a second access request and generating a third access request according to the second access request, specifically comprise:

Receiving the second access request, and acquiring second access request information; determining one or more contents of an actual address, a request method and a processing logic of the target network resource corresponding to the second access request according to a second corresponding relationship determined by configurations embedded in the system, from a local administrator or from a third-party, and converting the second access request information according to the determined one or more contents to generate third access request information; and generating the third access request according to the third access request information;

Preferably, receiving a second access request and generating a third access request according to the second access request, specifically comprise: receiving the second access request, and acquiring second access request information; discarding access request information beyond user portal permissions from the second access request information, then determining one or more contents of an actual address, a request method and a processing logic of the target network resource corresponding to the second access request according to a second corresponding relationship determined by configurations embedded in the system, from a local administrator or from a third-party, and converting access request information, obtained after the access request information beyond the user portal permissions are discharged, according to the determined one or more contents to generate third access request information; and generating the third access request according to the third access request information;

Preferably, receiving a second access request and generating a third access request according to the second access request, specifically comprise: receiving the second access request, and acquiring second access request information; filtering contents harmful to the resource portal or the target network resource or contents of sensitive or confidential information out of the second access request information, then determining one or more contents of an actual address, a request method and a processing logic of the target network resource corresponding to the second access request according to a second corresponding relationship determined by configurations embedded in the system, from a local administrator or from a third-party, and converting filtered access request information according to the determined one or more contents to generate third access request information; and generating the third access request according to the third access request information.

Preferably, receiving a first response and generating a second response according to the first response, specifically comprise:

Receiving the first response, and acquiring first response information; determining route information of a user portal corresponding to the first response according to a reverse route transmitted by the second access request; generating second response information according to contents of the first response information, and the route information; and generating the second response according to the second response information;

Preferably, receiving a first response and generating a second response according to the first response, specifically comprise: receiving the first response, and acquiring first response information; converting the first response information to generate information of an image code format as contents of second response information; determining route information of the user portal corresponding to the first response according to a reverse route transmitted by the second access request; generating the second response information according to the contents of the second response information, and the route information; and generating the second response according to the second response information;

Preferably, receiving a first response and generating a second response according to the first response, specifically comprise: receiving the first response, and acquiring first response information; filtering contents harmful to the user portal or contents of sensitive or confidential information out of the first response information, and then converting filtered response information to generate information of an image code forma as contents of second response information; determining route information of the user portal corresponding to the first response according to a reverse route transmitted by the second access request; generating the second response information according to the contents of the second response information, and the route information; and generating the second response according to the second response information;

Preferably, receiving a first response and generating a second response according to the first response, specifically comprise: receiving the first response, and acquiring first response information; checking the validity of the first response information, and discarding illegal response information from the first response information; converting information, obtained after the illegal response information is discarded, to generate information of an image code format as contents of second response information; determining route information of the user portal corresponding to the first response according to a reverse route transmitted by the second access request; generating the second response information according to the contents of the second response information, and the route information; and generating the second response according to the second response information.

Preferably, the conversion specifically comprises: presenting the first response information by means of a corresponding presentation tool according to the type of the target network resource or the data type and contents of the first response information, and generating the information of the image code format by projection or drawing according to presented contents;

Preferably, the conversion specifically comprises: presenting the filtered response information by means of a corresponding presentation tool according to the type of the target network resource or the data type and contents of the first response information, and generating the information of the image code format by projection or drawing according to presented contents;

Preferably, the conversion specifically comprises: presenting the information, obtained after the illegal response information is discarded, by means of a corresponding presentation tool according to the type of the target network resource or the data type and contents of the first response information, and generating the information of the image code format by projection or drawing according to presented contents.

Preferably, the resource portal only receives an access request sent from a user portal capable of establishing a communication connection with the resource portal, and determines whether to receive the access request according to whether the current state of the user portal is normal; and the resource portal sends a resource list and/or response only to a user portal capable of establishing a communication connection with the resource portal, and determines whether to send the resource list and/or response according to whether the current state of the user portal is normal.

A resource portal comprises a memory and a processor that are in a communication connection, and a computer program stored in the memory and to be run on the processor, wherein when the computer program is run by the processor, the method mentioned above is implemented.

The invention has the following beneficial effects:

1. Users access network resources by three stages: user terminal to user portal, user portal to resource portal, and resource portal to network resource, so that the users do not directly communicate or interact with target network resources; that is, the users are isolated from the network resource and access the network resources in a periscopic manner by means of a user terminal (user terminal→user portal→resource portal→network resource), so that only reasonable information is transmitted, unnecessary information disclosure is reduced, and the users are prevented from launching any penetration, attack and destruction by means of vulnerabilities/bugs of the network resources.

2. Users are managed by the user portal, network resource are managed by the resource portal, and the user portal and the resource portal have separate management responsibilities, are independent of each other and are not associated, so that management of the users and the network resources is optimized and are easier and more flexible.

3. If a network where the user terminal and the user portal are located, a network where the user portal and the resource portal are located and a network where the resource portal and network resources are located belong to the same network, another path can be established by the system when users access a certain network resource, and an original network access path does not need to be modified, so compared with a direct access method in the prior art, the bandwidth is broader, the access time is shorter, and access requests can be gathered; if a network where the user terminal and the user portal are located, a network where the user portal and the resource portal are located and a network where the resource portal and network resources are located belong to different networks, users can access network resources, that cannot be directly accessed, by means of the system.

4. Users can access multiple target network resources by means of the same user portal.

5. A third access request received by a network resource is formed after a first access request initiated by a user by means of a user terminal is processed twice by the user portal and the resource portal, so that the network resource is effectively prevented from receiving a request that is harmful to the network resource or may cause information leaking; similarly, a third response received by the user terminal is formed after a response returned by the network resource is processed twice by the resource portal and the user portal, so that the user terminal is effectively prevented from receiving a response that is harmful to the user terminal or may cause information leaking.

DETAILED DESCRIPTION OF THE INVENTION

To better clarify the purposes, technical solutions and advantages of the embodiments of the invention, the technical solutions of the embodiments of the invention will be clearly and completely described. Obviously, the embodiments in the following description are merely illustrative ones, and are not all possible ones of the invention. All other embodiments obtained by those ordinarily skilled in the art without creative labor should also fall within the protection scope of the invention.

By adoption of a system of the invention, users access network resources in a periscopic manner by means of a user terminal (user terminal→>user portal→>resource portal→>network resource), and only reasonable information is transmitted, so that users are prevented from launching any penetration, attack and destruction by means of vulnerabilities/bugs of the network resources.

For the sake of a good understanding, the relationship between access request and access request information, and the relationship between response, response information and contents of response information are defined as follows:

The access request obtained by adding information for network transmission such as a network communication transmission format and conversation information based on the access request information. The response information is obtained by adding attributes such as a sender, a receiver and a content type based on the contents of the response information, and the response is obtained by adding information for network transmission such as a network communication transmission format and conversation information based on the response information.

Figure 1:
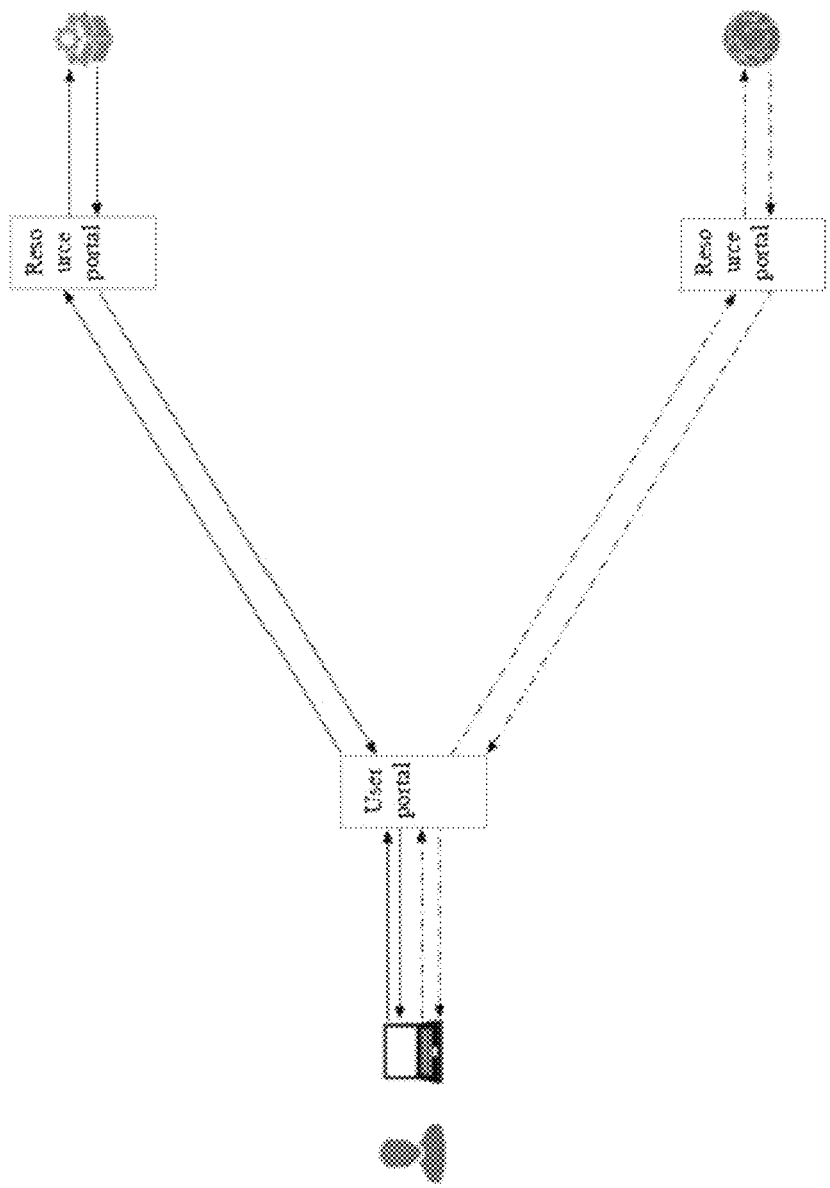
FIG. 1 is a framework diagram of a network resource access system according to the invention.
Figure 2:
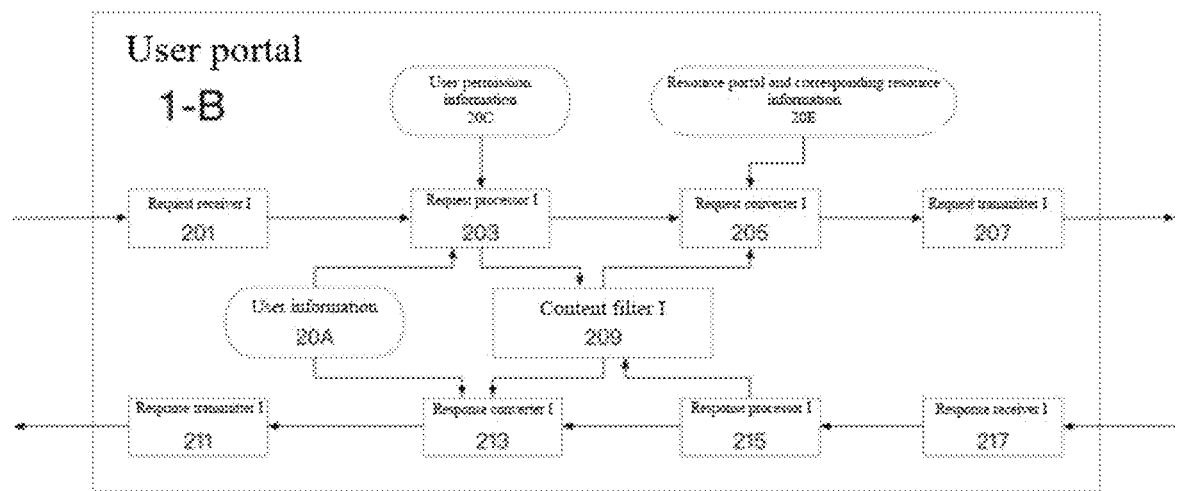
FIG. 2 is a detailed structural diagram of a user portal in the network resource access system according to the invention.
Figure 3:
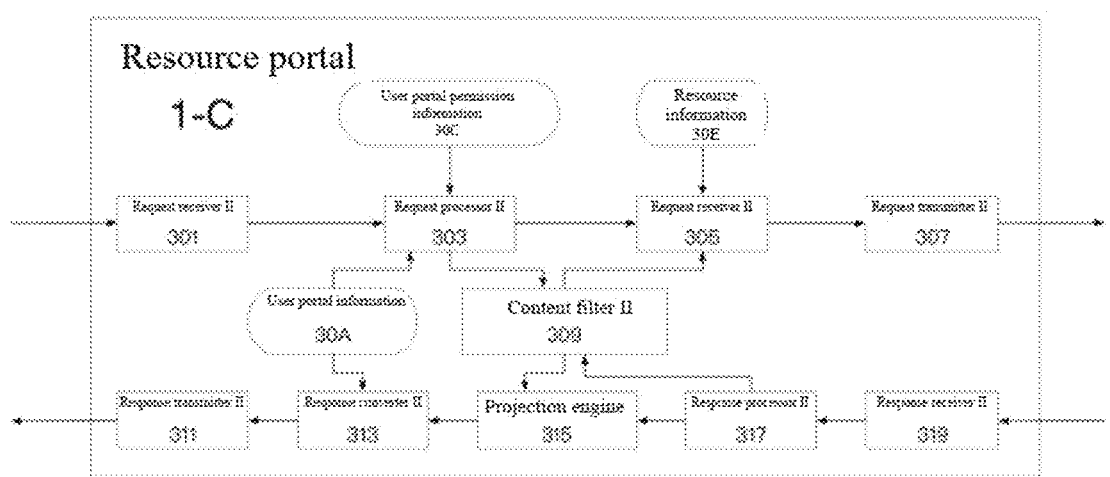
FIG. 3 is a detailed structural diagram of a resource portal in the network resource access system according to the invention.

As shown in FIG. 1-FIG. 3, this embodiment provides a network resource access system, comprising a user portal 1-B and a resource portal 1-C that are in a communication connection, wherein:

The user portal 1-B is configured to acquire a list of resource portals, capable of communicating with the user portal 1-B, according to a configuration from an administrator or from a third party, and use a resource list associated with resource portals as an accessible resource list, and is also configured to receive a first access request initiated by a user by means of a user terminal and aiming at a target network resource in the accessible resource list (the first access request is directly or indirectly sent to the user portal by means of the user terminal), generate a second access request according to the first access request, and then send the second access request to the resource portal 1-C.

In this embodiment, the user portal 1-B receives the first access request by means of a request receiver 1201, acquires first access request information, and then transmits the first access request information to a request processor I 203; the request processor I 203 checks the validity of the first access request information according to user information 20A and discards illegal request information (including fake or suspicious user requests such as a log-in request from a domestic user in Africa) from the first access request information; the request processor I 203 discards access request information beyond user permissions according to user permission information 20C, and after the access request information beyond user permissions is discarded, information processed by the request processor I 203 is transmitted to a request converter I 205; the request converter I 205 determines a resource portal and route information corresponding to the target network resource corresponding to the first access request according to a first corresponding relationship (from the resource portal and corresponding resource information 20E) determined by configurations embedded in the system, from a local administrator or from a third-party, the information processed by the request processor I 203 is converted according to the determined information (the resource portal and route information corresponding to the target network resource corresponding to the first access request) to generate second access request information that is transmitted to a request transmitter I 207; and the request transmitter I 207 packages the second access request information (such as by adding information for network transmission such as a network communication transmission format or conversation information) to generate a corresponding second access request.

The following solutions may be adopted to receive a first access request and generate a second access request according to the first access request: a, a request receiver I 201 receives the first access request, acquires first access request information, and then transmits the first access request information to a request processor I 203; the request processor I 203 checks the validity of the first access request information according to user information 20A and discards illegal request information (including fake or suspicious user requests such as a log-in request from a domestic user in Africa) from the first access request information; the request processor I 203 discards access request information beyond user permissions according to user permission information 20C, and after the access request information beyond user permissions is discarded, information processed by the request processor I 203 is transmitted to a content filter I 209; the content filter I 209 filters contents harmful to the resource portal or the target network resource or contents of sensitive or confidential information out of the received information, and then transmits the filtered information to a request converter I 205; the request converter I 205 determines a resource portal and route information corresponding to the target network source corresponding to the first access request according to a first corresponding relationship determined by configurations embedded in the system, from a local administrator or from a third-party, converts information filtered by the content filter I 209 according to the determined information (the resource portal and route information corresponding to the target network source corresponding to the first access request) to generate second access request information, and transmits the second access request information to a request transmitter I 207; and the request transmitter I 207 packages the second access request information to generate a corresponding second access request. b, a request receiver I 201 receives the first access request, acquires first access request information, and then transmits the first access request information to a request converter I 205; the request converter I 205 determines a resource portal and route information corresponding to the target network resource corresponding to the first access request according to a first corresponding relationship determined by configurations embedded in the system, from a local administrator or from a third-party, converts the first access request information according to the determined information (the resource portal and route information corresponding to the target network resource corresponding to the first access request) to generate second access request information, and transmits the second access request information to a request transmitter I 207; and the request transmitter I 207 packages the second access request information to generate a corresponding second access request. c, a request receiver I 201 receives the first access request, acquires first access request information, and then transmits the first access request information to a content filter I 209; the content filter I 209 filters contents harmful to the resource portal or the target network resource or contents of sensitive or confidential information out of the received information, and then transmits the filtered information to a request converter I 205; the request converter I 205 determines a resource portal and route information corresponding to the target network resource corresponding to the first access request according to a first corresponding relationship determined by configurations embedded in the system, from a local administrator or from a third-party, converts the information processed by the content filter I 209 according to the determined information (the resource portal and route information corresponding to the target network resource corresponding to the first access request) to generate second access request information, and transmits the second access request information to a request transmitter I 207; and the request transmitter I 207 packages the second access request information to generate a corresponding access request.

The solution adopted by the request processor I 203 to process information is not limited to the above one, and may also be at least one of the following three solutions: the request processor I 203 checks the validity of the first access request information according to user information 20A and discards illegal request information (including fake or suspicious user requests such as a log-in request from a domestic user in Africa) from the first access request information; or, the request processor I 203 discards access request information beyond user permissions according to user permission information 20C; or, the request processor I 203 discards access request information beyond user portal permissions.

The resource portal 1-C is configured to acquire resource information associated with the resource portal according to a configuration from an administrator or from a third party, as well as a list of user portals capable of communicating with the resource portal, receive a second access request sent from a user portal in the list of user portals, generate a third access request according to the second access request, and then send the third access request to a target network resource server (the resource portal sends the third access request to the target network resource server directly or indirectly).

In this embodiment, the resource portal 1-C receives the second access request by means of a request receiver II 301, acquires second access request information, and then transmits the second access request information to a request processor II 303; the request processor II 303 discards access request information beyond user portal permissions according to user portal permission information 30C, and then information processed by the request processor II 303 is transmitted to a request converter II 305; the request converter II 305 determines one or more contents of an actual address, a request method and a processing logic of the target network resource corresponding to the second access request according to a second corresponding relationship (from resource information 30E) determined by configurations embedded in the system, from a local administrator or from a third-party, converts the information processed by the request processor II 303 according to the determined or more contents to generate third access request information, and transmits the third access request information to a request transmitter II 307; and the request transmitter II 307 packages the third access request information (for example, by adding information for network transmission such as a network communication transmission format, or conversation information) to generate a corresponding third access request.

The following solutions may be adopted to receive a second access request and generate a third access request according to the second access request: a, a request receiver II 301 receives the second access request, acquires second access request information, and then transmits the second access request information to a request processor II 303; the request processor II 303 discards access request information beyond user portal permissions according to user portal permission information 30C, and then information processed by the request processor II 303 is transmitted to a content filter II 309; the content filter II 309 filters contents harmful to the resource portal or the target network resource or contents of sensitive or confidential information out of the received information, and then transmits the filtered information to a request converter II 305; the request converter II 305 determines one or more contents of an actual address, a request method and a processing logic of the target network resource corresponding to the second access request according to a second corresponding relationship determined by configurations embedded in the system, from a local administrator or from a third-party, converts the information processed by the content filter II 309 according to the determined one or more contents to generate third access request information, and transmits the third access request information to a request transmitter II 307; and the request transmitter II 307 packages the third access request information to generate a corresponding third access request. b, a request receiver II 301 receives the second access request, acquires second access request information, and then transmits the second access request information to a request converter II 305; the request converter II 305 determines one or more contents of an actual address, a request method and a processing logic of the target network resource corresponding to the second access request according to a second corresponding relationship determined by configurations embedded in the system, from a local administrator or from a third-party, converts the second access request information according to the determined one or more contents to generate third access request information, and transmits the third access request information to a request transmitter II 307; and the request transmitter II 307 packages the third access request information to generate a corresponding third access request. c, a request receiver II 301 receives the second access request, acquires second access request information, and then transmits the second access request information to a content filter II 309; the content filter II 309 filters contents harmful to the resource portal or the target network resource or contents of sensitive or confidential information out of the received information, and then transmits the filtered information to a request converter II 305; the request converter II 305 determines one or more contents of an actual address, a request method and a processing logic of a target network source corresponding to the second access request according to a second corresponding relationship determined by configurations embedded in the system, from a local administrator or from a third-party, converts information processed by the content filter II 309 according to the determined one or more contents to generate third access request information, and transmits the third access request information to a request transmitter II 307; and the request transmitter II 307 packages the third access request information to generate a corresponding third access request. In the above solutions, the request processor II 303 may check the validity of the access request according to user portal information 30A and discard illegal request information from the access request.

As a preferred implementation of this embodiment,

The resource portal 1-C is also configured to receive a first response to the third access request returned by the target network resource server, generate a second response to the second access request according to the first response, and send the second response to the user portal 1-B (directly or indirectly).

In this embodiment, the resource portal 1-C receives the first response by means of a response receiver II 319, acquires first response information, and then transmits the first response information to a response processor II 317; the response processor II 317 checks the validity of the first response information, discards illegal response information (including fake or suspicious response information such as outdated or repetitive response information) from the first response information, and then transmits the processed information to a projection engine 315; the projection engine 315 presents received information by means of a corresponding presentation tool according to the type of the target network resource or the data type and contents of the first response information, performs projection according to presented contents to generate information of an image code format as contents of second response information, and transmits the information of the image code format to a response converter II 313; the response converter II 313 acquires route information of a user portal corresponding to the first response from user portal information 30A according to a reverse route transmitted by the second access request, generates the second response information according to the contents of the second response information, and the acquired route information, and sends the second response information to a response transmitter II 311; and the response transmitter II 311 packages the second response information (for example, by adding information for network transmission such as a network communication transmission format, or conversation information) to generate a corresponding second response.

The following solutions may be adopted to receive a first response and generate a second response according to the first response: a, a response receiver II 319 receives the first response, acquires first response information, and then transmits the first response information to a response processor II 317; the response processor II 317 checks the validity of the first response information, discards illegal response information (including fake or suspicious response information such as outdated or repetitive response information) from the first response information, and then transmits the processed information to a content filter II 309; the content filter II 309 filters contents harmful to the user portal or contents of sensitive or confidential information out of the received information and then transmits the filtered information to a projection engine 315; the projection engine 315 presents the received information by means of a corresponding presentation tool according to the type of the target network resource or the data type and contents of the first response information, performs projection according to presented contents to generate information of an image code format as contents of second response information, and transmits the information of the image code format to a response converter II 313; the response converter II 313 acquires route information of the user portal corresponding to the first response from user portal information 30A according to a reverse route transmitted by the second access request, generates the second response information according to the contents of the second response information, and the acquired route information, and sends the second response information to a response transmitter II 311; and the response transmitter II 311 packages the second response information to generate a corresponding second response. b, a response receiver II 319 receives the first response, acquires first response information, and then transmits the first response information to a response converter II 313; the response converter II 313 acquires route information of the user portal corresponding to the first response from user portal information 30A according to a reverse route transmitted by the second access request, generates second response information according to contents of the first response information, and the acquired route information, and sends the second response information to a response transmitter II 311; and the response transmitter II 311 packages the second response information to generate a corresponding second response. c, a response receiver II 319 receives the first response, acquires first response information, and then transmits the first response information to a content filter II 309; the content filter II 309 filters contents harmful to the user portal or contents of sensitive or confidential information out of received information, and then transmits the filtered information to a projection engine 315; the projection engine 315 presents the received information by means of a corresponding presentation tool according to the type of the target network resource or the data type and contents of the first response information, performs projection according to presented contents to generate information of an image code information as contents of second response information, and transmits the information of the image code information to a response converter II 313; the response converter II 313 acquires route information of the user portal corresponding to the first response from user portal information according to a reverse route transmitted by the second access request, generates second response information according to the contents of the second response information, and the acquired route information, and sends the second response information to a response transmitter II 311; and the response transmitter II 311 packages the second response information to generate a corresponding second response. d, a response receiver II 319 receives the first response, acquires first response information, and then transmits the first response information to a projection engine 315; the projection engine 315 presents the received information by means of a corresponding presentation tool according to the type of the target network resource or the data type and contents of the first response information, performs projection according to presented contents to generate information of an image code format as contents of second response information, and transmits the information of the image code format to a response transmitter II 313; the response transmitter II 313 acquires route information of the user portal corresponding to the first response from user portal information 30A according to a reverse route transmitted by the second access request, generates the second response information according to the contents of the second response information, and the acquired route information, and sends the second response information to a response transmitter II 311; and the response transmitter II 311 packages the second response information to generate a corresponding second response.

The user portal 1-B is also configured to receive a second response returned by the resource portal 1-C, generate a third response to the first access request according to the second response, and send the third response to the user terminal (directly or indirectly).

In this embodiment, the user portal 1-B receives the second response by means of a response receiver I 217, acquires second response information, and then sends the second response information to a response converter I 213; the response converter I 213 acquires route information of the user terminal corresponding to the second response from user information 20A according to a reverse route transmitted by the first access request, generates third response information according to contents of the second response information, and the acquired route information, and sends the third response information to a response transmitter I 211; and the response transmitter I 211 packages the third response information (for example, by adding information for network transmission such as a network communication transmission format, and conversation information) to generate a corresponding third response.

The following solutions may be adopted to receive a second response and generate a third response according to the second response: a, a response receiver I 217 receives the second response, acquires second response information, and then sends the second response information to a response processor I 215; the response processor I 215 checks the validity of the second response information, discards illegal response information (including fake or suspicious response information such as outdated or repetitive response information) from the second response information, and transmits the processed information to a response converter I 213; the response converter I 213 acquires route information of the user terminal corresponding to the second response from user information 20A according to a reverse route transmitted by the first access request, generates third response information according to the acquired route information and contents of the information transmitted from the response processor I 215, and sends the third response information to a response transmitter I 211; and the response transmitter I 211 packages the third response information to generate a corresponding third response. b, a response receiver I 217 receives the second response, acquires second response information, and then sends the third response information to a content filter I 209; the content filter I 209 filters contents harmful to the user terminal or contents of sensitive or confidential information out of the received information, and then transmits the filtered information to the response converter I 213; the response converter I 213 acquires route information of the user terminal corresponding to the second response from the user information 20A according to a reverse route transmitted by the first access request, generates third response information according to the acquired route information and contents of the information transmitted from the content filter 1209, and sends the third response information to a response transmitter I 211; and the response transmitter I 211 packages the third response information to generate a corresponding third response. c, a response receiver I 217 receives the second response, acquires second response information, and then sends the second response information to a response processor I 215; the response processor I 215 checks the validity of the second response information, discards illegal response information (including fake or suspicious response information such as outdated or repetitive response information) from the second response information, and then transmits processed information to a content filter I 209; the content filter I 209 filters contents harmful to the user terminal or contents of sensitive or confidential information out of the received information, then transmits the filtered information to a response converter I 213; the response converter I 213 acquires route information of the user terminal corresponding to the second response from user information 20A according to a reverse route transmitted by the first access request, generates third response information according to the acquired route information and contents of the information transmitted from the content filter 1209, and sends the third response information to a response transmitter I 211; and the response transmitter I 211 packages the third response information to generate a corresponding third response.

Preferably, the user portal sends an access request only to a resource portal capable of establishing a communication connection with the user portal, and determines whether to send the request according to whether the current state of the resource portal is normal; the user portal sends a response only to a resource portal capable of establishing a communication connection with the user portal, and determines whether to receive the response according to whether the current state of the resource portal is normal; the resource portal only receives an access request sent from a user portal capable of establishing a communication connection with the resource portal, and determines whether to receive the access request according to whether the current state of the user portal is normal; the resource portal sends a resource list and/or response only to a user portal capable of establishing a communication connection with the resource portal, and determines whether to send the resource list and/or response according to whether the current state of the user portal is normal; the user portal is also used for managing user information and verifying user permissions; and the resource portal is also used for managing resource information and monitoring the resource state.

Figure 4:
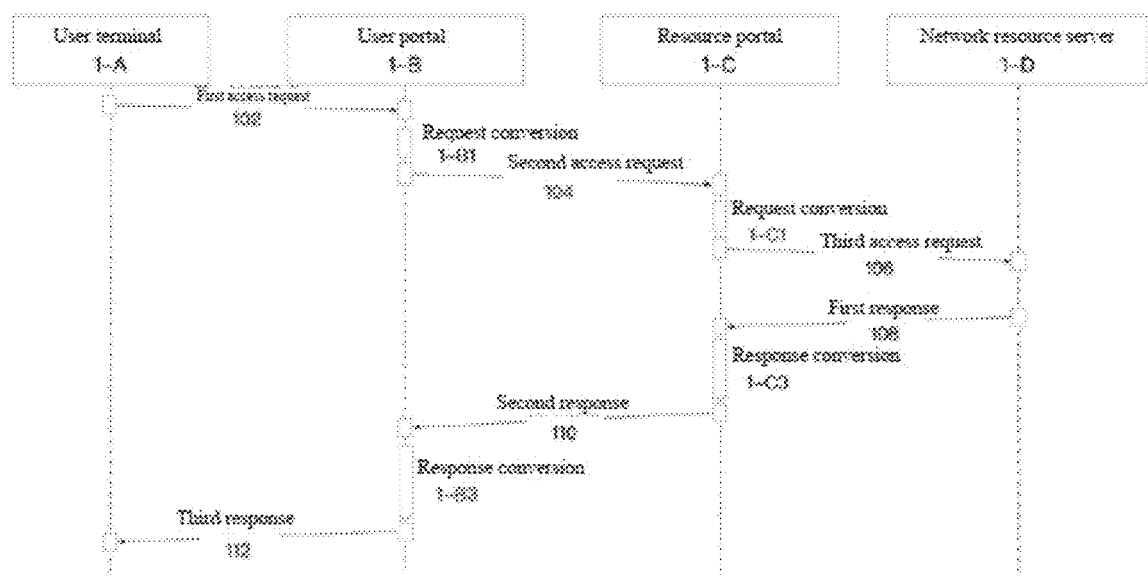
FIG. 4 is a sequence diagram of a network resource access processing method according to the invention.
Figure 5:
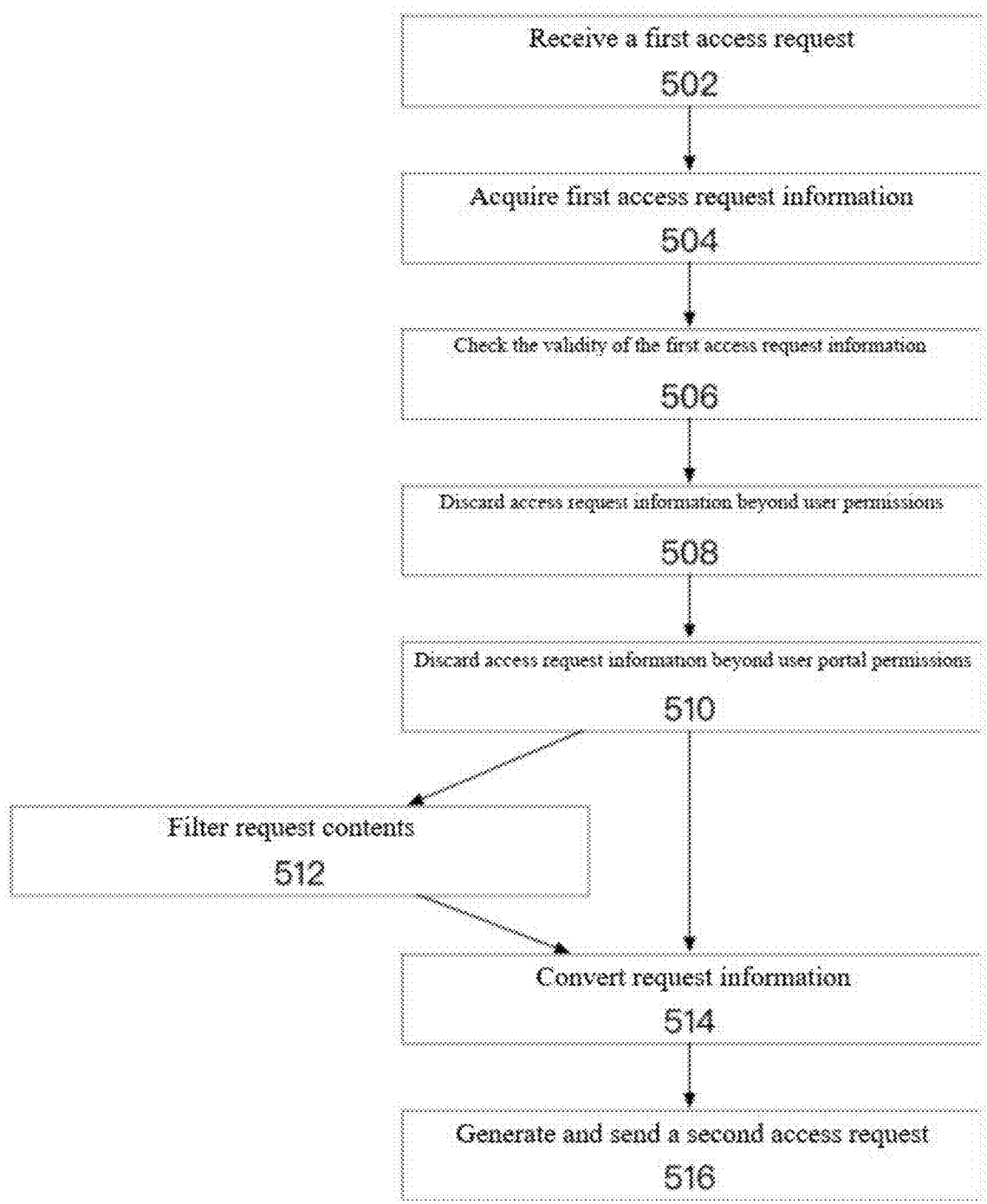
FIG. 5 is a step diagram for generating a second access request according to the invention.

As shown in FIG. 4, this embodiment provides a network resource access method, comprising:

Initiating a first access request 102 aiming at a target network resource by a user by means of a user terminal 1-A (or by means of a network agent service), and transmitting the first access request to a user portal 1-B, wherein the user portal 1-B acquires a list of resource portals, capable of communicating with the user portal 1-B, according to a configuration from an administrator or from a third party, and uses a resource list associated with resource portals as an accessible resource list; and the user selects the target network source, that the user is about to access, from the accessible resource list; and Receiving the first access request 102, generating a second access request 103 according to the first access request (request conversion in Step 1-B1), and then sending the second access request 104 to a resource portal 17, by the user portal 1-B. As shown in FIG. 5, receiving a first access request and generating a second access request according to the first access request (request conversion in Step 1-B1), specifically comprise:

502: receiving the first access request 102 by a request receiver I 201 in the user portal 1-B;

504: acquiring the first access request information by the request receiver I 201 in the user portal 1-B, and sending the first access request information to a request processor I 203;

506: checking the validity of the first access request information according to user information 20A, and discarding illegal request information (including fake or suspicious user requests such as a log-in request from a domestic user in Africa) from the first access request information, by the request processor I 203;

508: discarding access request information beyond user permissions according to user permission information 20C by the request processor I 203;

510: discarding access request information beyond user portal permissions by the request processor 1203.

514: converting the request information by a request converter I 205: determining a resource portal and route information corresponding to the target network resource corresponding to the first access request according to a first corresponding relationship (from the resource portal and corresponding resource information 20E) determined by configurations embedded in the system, from a local administrator or from a third-party, converting the information processed by the request processor I 203 according to the determined information (the resource portal and route information corresponding to the target network resource corresponding to the first access request) to generate second access request information, and transmitting the second access request information to a request transmitter I 207; and

516: packaging the second access request information (for example, by adding information for network transmission such as a network communication transmission format, or conservation information) to generate a corresponding second access request 104, and sending the second access request 104 to the resource portal 1-C, by the request transmitter 1207.

The following solutions may be adopted for receiving a first access request and generating a second access request according to the first access request:

Solution 1:

502: receiving the first access request 102 by a request receiver I 201 in the user portal 1-B;

504: acquiring the first access request information by the request receiver I 201 in the user portal 1-B, and sending the first access request information to a request processor I 203;

506: checking the validity of the first access request information according to user information 20A, discarding illegal request information (including fake or suspicious user requests such as a log-in request from a domestic user in Africa) from the first access request information, by the request processor I 203;

508: discarding access request information beyond user permissions according to user permission information 20C by the request processor I 203;

510: discarding access request information beyond user portal permissions by the request processor 1203, and sending the information processed by the request processor I 203 to a content filter I 209;

512: filtering out contents harmful to the resource portal or the target network resource or contents of sensitive or confidential information, and sending the filtered information to a request converter 1205, by the content filter 1209.

514: converting the request information by a request converter I 205: determining a resource portal and route information corresponding to the target network resource corresponding to the first access request according to a first corresponding relationship (from the resource portal and corresponding resource information 20E) determined by configurations embedded in the system, from a local administrator or from a third-party, converting the information processed by the content filter I 209 according to the determined information (the resource portal and route information corresponding to the target network resource corresponding to the first access request) to generate second access request information, and transmitting the second access request information to a request transmitter I 207;

516: packaging the second access request information (for example, by adding information for network transmission such as a network communication transmission format, or conservation information) to generate a corresponding second access request 104, and sending the second access request 104 to the resource portal 1-C, by the request transmitter 1207.

Solution 2: receiving the first request, and acquiring first access request information; determining a resource portal and route information corresponding to the target network resource corresponding to the first access request according to a first corresponding relationship determined by configurations embedded in the system, from a local administrator or from a third-party, and converting the first access request information according to the determined information to generate second access request information; and generating the second access request according to the second access request information;

Solution 3: receiving the first request, and acquiring first access request information; checking the validity of the first access request information, and discarding illegal request information from the first access request information; determining a resource portal and route information corresponding to the target network resource corresponding to the first access request according to a first corresponding relationship determined by configurations embedded in the system, from a local administrator or from a third-party, and converting access request information, obtained after the illegal request information is discarded, according to the determined information to generate second access request information; and generating the second access request according to the second access request information;

Solution 4: receiving the first request, and acquiring first access request information; discarding access request information beyond user permissions from the first access request information, and then determining a resource portal and route information corresponding to the target network resource corresponding to the first access request according to a first corresponding relationship determined by configurations embedded in the system, from a local administrator or from a third-party, and converting access request information, obtained after the access request information beyond user permissions is discarded, according to the determined information to generate second access request information; and generating the second access request according to the second access request information;

Solution 5: receiving the first request, and acquiring first access request information; discarding access request information beyond user portal permissions from the first access request information, and then determining a resource portal and route information corresponding to the target network resource corresponding to the first access request according to a first corresponding relationship determined by configurations embedded in the system, from a local administrator or from a third-party, and converting access request information, obtained after the access request information beyond user portal permissions is discarded, according to the determined information to generate second access request information; and generating the second access request according to the second access request information;

Solution 6: receiving the first request, and acquiring first access request information; filtering contents harmful to the resource portal or the target network resource or contents of sensitive or confidential information out of the first access request information, then determining a resource portal and route information corresponding to the target network resource corresponding to the first access request according to a first corresponding relationship determined by configurations embedded in the system, from a local administrator or from a third-party, and converting the filtered access request information according to the determined information to generate second access request information; and generating the second access request according to the second access request information.

Figure 6:
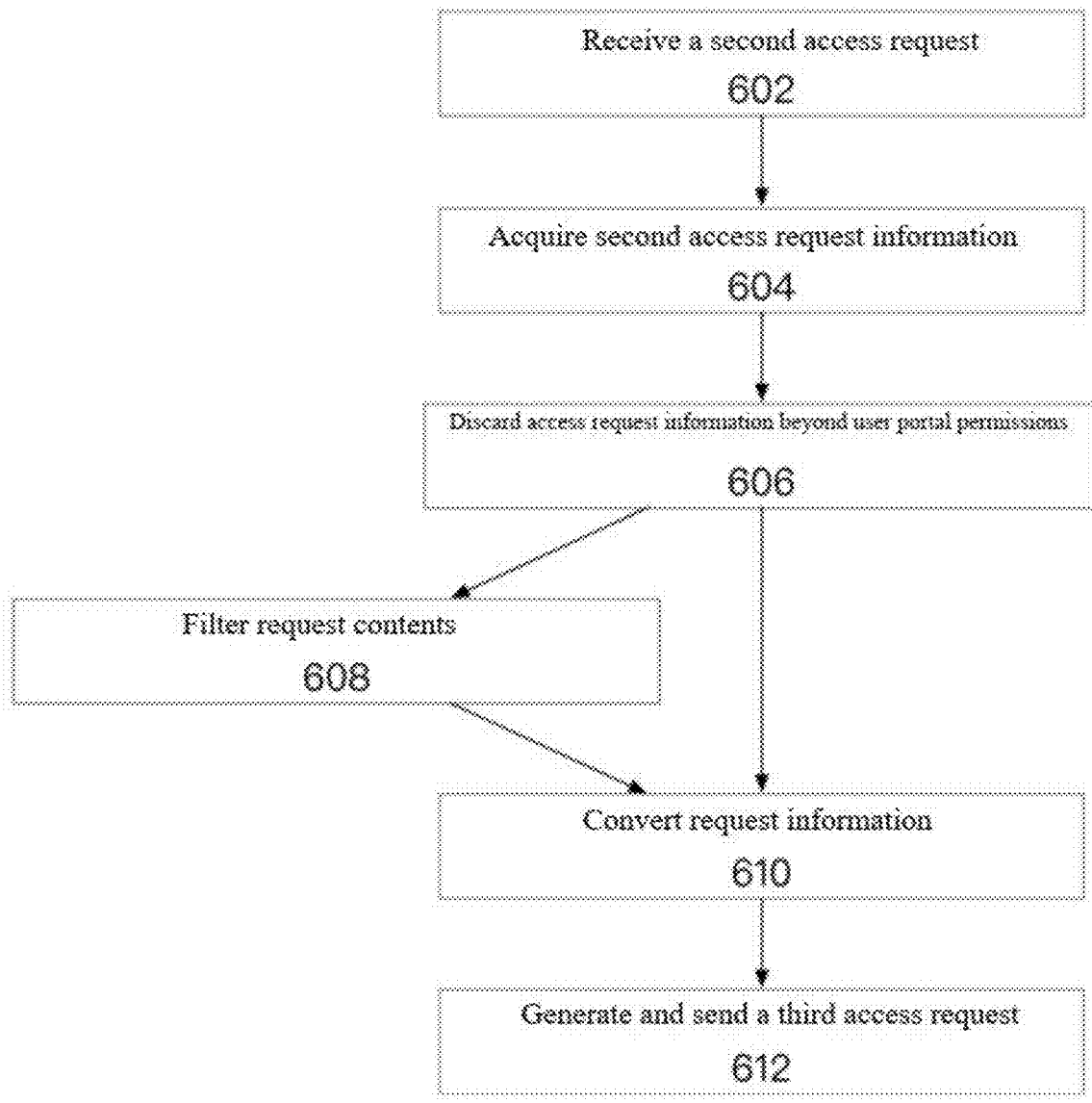
FIG. 6 is a step diagram for generating a third access request according to the invention.

The network resource access method further comprises: acquiring, by the resource portal 1-C, resource information associated with the resource portal according to a configuration from an administrator or from a third party, as well as a list of user portals capable of communicating with the resource portal, receiving a second access request 104 sent from a user portal in the list of user portals, generating a third access request 106 according to the second access request (request conversion in step 1-C1), and then sending the third access request to a target network resource server 1-D. As shown in FIG. 6, receiving a second access request and generating a third access request according to the second access request (request conversion in Step 1-C1), specifically comprise:

602: receiving a second access request 104 by a request receiver II 301 in the resource portal 1-C;

604: acquiring second access request information by the request receiver II 301 in the resource portal 1-C, and sending the second access request information to a request processor II 303;

606: discarding access request information beyond user portal permissions according to user portal permission information 30C, and then transmitting the information processed by the request processor II 303 to a request converter II 305, by the request processor II 303;

610: converting the request information by a request converter II 305: determining one or more contents of an actual address, a request method and a processing logic of the target network resource corresponding to the second access request according to a second corresponding relationship (from resource information 30E) determined by configurations embedded in the system, from a local administrator or from a third-party, converting the information processed by the request processor II 303 according to the determined one or more contents to generate third access request information, and sending the third access request information to a request transmitter II 307; and 612: packaging the third access request information (for example, by adding information for network transmission such as a network communication transmission format, or conservation information) to generate a corresponding third access request 106, and sending the third access request 106 to the target network resource server 1-D, by the request transmitter II 307.

The following several solutions may be adopted for receiving a second access request and generating a third access request according to the second access request:

Solution 1:

602: receiving a second access request 104 by a request receiver U301 in the resource portal 1-C;

604: acquiring second access request information by the request receiver II 301 in the resource portal 1-C, and sending the second access request information to a request processor II 303;

606: discarding access request information beyond user portal permissions according to user portal permission information 30C, and then transmitting the information processed by the request processor II 303 to a content filter II 309, by the request processor II 303;

608: filtering out contents harmful to the resource portal or the target network resource or contents of sensitive or confidential information, and sending the filtered information to a request converter II 305, by the content filter II 309;

610: converting the request information by the request converter II 305: determining one of more contents of an actual address, a request method and a processing logic of the target network resource corresponding to the second access request according to a second corresponding relationship (from resource information 30E) determined by configurations embedded in the system, from a local administrator or from a third-party, converting the information processed by the content filter II 309 according to the determined one or more contents to generate third access request information, and transmitting the third access request information to a request transmitter II 307; and 612: packaging the third access request information (for example, by adding information for network transmission such as a network communication transmission format, or conservation information) to generate a corresponding third access request 106, and sending the third access request 106 to the target network resource server 1-D, by the request transmitter II 307.

Figure 7:
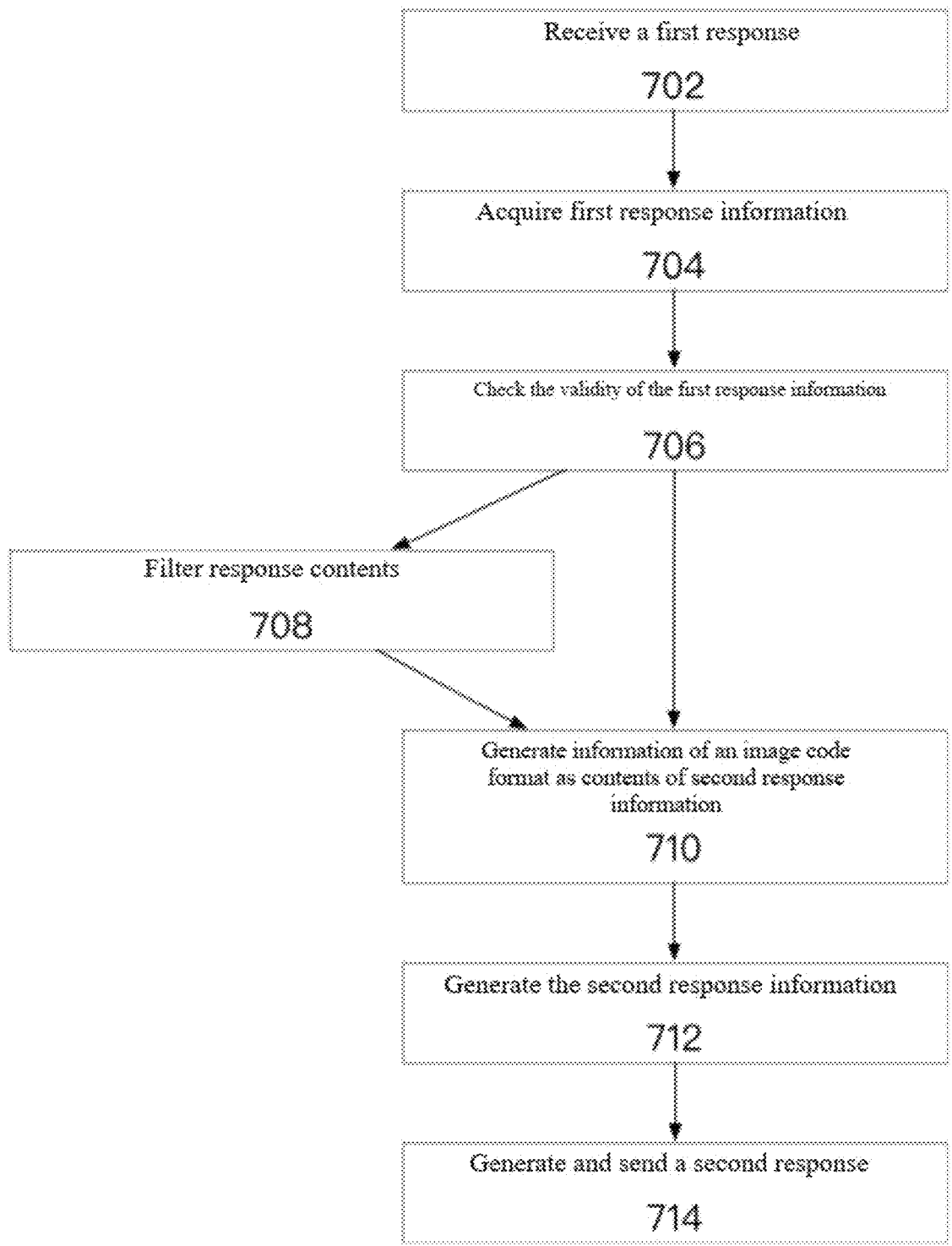
FIG. 7 is a step diagram for generating a second response according to the invention.

Solution 2: receiving the second access request, and acquiring second access request information; determining one or more contents of an actual address, a request method and a processing logic of the target network resource corresponding to the second access request according to a second corresponding relationship determined by configurations embedded in the system, from a local administrator or from a third-party, and converting the second access request information according to the determined one or more contents to generate third access request information; and generating the third access request according to the third access request information;

Solution 3: receiving the second access request, and acquiring second access request information; filtering contents harmful to the resource portal or the target network resource or contents of sensitive or confidential information out of the second access request information, then determining one or more contents of an actual address, a request method and a processing logic of the target network resource corresponding to the second access request according to a second corresponding relationship determined by configurations embedded in the system, from a local administrator or from a third-party, and converting the filtered access request information according to the determined one or more contents to generate third access request information; and generating the third access request according to the third access request information;

The network resource access method further comprises: receiving, by the resource portal 1-C, a first response 108 to the third access request 106 returned by the target network resource server 1-D, and generating a second response 110 to the second access request 104 according to the first response (response conversion in Step 1-C3), and sending the second response 110 to the user portal 1-B. As shown in FIG. 7, receiving a first response and generating a second response according to the first response (response conversion in Step 1-C3), specifically comprise:

702: receiving a first response 104 by a response receiver II 319 in the resource portal 1-C;

704: acquiring first response information, and sending the first response information to a response processor II 317, by the response receiver II 319 in the resource portal 1-C;

706: checking the validity of the first response information, discarding illegal response information (including fake or suspicious response information such as outdated or repetitive response information) from the first response information, and then transmitting the processed information to a projection engine 315, by the response processor II 317;

710: generating information of an image code format as contents of second response information by the projection engine 315: presenting the received information by means of a corresponding presentation tool according to the type of the target network resource or the data type and contents of the first response information, generating the information of the image code format as the contents of the second response information by projection according to presented contents, and transmitting the information of the image code format to a response converter II 313;

712: acquiring route information of the user portal corresponding to the first response from user portal information 30A according to a reverse route transmitted by the second access request, generating the second response information according to the contents of the second response information, and the acquired route information (obtaining the second response information by adding attribute information such as a sender, a receiver or a content type to the contents of the second response information), and sending the second response information to a response transmitter II 311, by the response converter II 313; and

714: packaging the second response information (for example, by adding information for network transmission such as a network communication transmission format, or conservation information) to generate a corresponding second response 110 to the second access request 104, and sending the second response 110 to the user portal 1-B, by the response transmitter Ii 311.

The following technical solutions may be adopted for receiving a first response and generating a second response according to the first response:

Solution 1

702: receiving a first response 108 by a response receiver II 319 in the resource portal 1-C;

704: acquiring first response information, sending the first response information to the a response processor II 317, by the response receiver II 319 in the resource portal 1-C;

706: checking the validity of the first response information, discarding illegal response information (including fake or suspicious response information such as outdated or repetitive response information) from the first response information, and then transmitting the processed information to a content filter II 309, by the response processor II 317;

708: filtering out contents harmful to the user portal or contents of sensitive or confidential information, and sending the filtered information to a projection engine 315, by the content filter II 309;

710: generating information of an image code format as contents of second response information by the projection engine 315: presenting the received information by means of a corresponding presentation tool according to the type of the target network resource or the data type and contents of the first response information, generating the information of the image code format as the contents of the second response information projection according to presented contents, and transmitting the information of the image code format to a response converter II 313;

712: acquiring route information of the user portal corresponding to the first response from user portal information 30A according to a reverse route transmitted by the second access request, generating the second response information according to the contents of the second response information, and the acquired route information (obtaining the second response information by adding attribute information such as a sender, a receiver or a content type to the contents of the second response information), and sending the second response information to a response transmitter II 311, by the response converter II 313; and

714: packaging the second response information (for example, by adding information for network transmission such as a network communication transmission format, or conservation information) to generate a corresponding second response 110 to the second access request 104, and sending the second response 110 to the user portal 1-B, by the response transmitter II 311.

Solution 2: receiving a first response, and acquiring first response information; determining route information corresponding to the user portal corresponding to the first response according to a reverse route transmitted by the second access request; generating second response information according to contents of the first response information, and the route information; and generating the second response according to the second response information.

Solution 3: receiving a first response, and acquiring first response information; converting the first response information to generate information of an image code format as contents of second response information (specifically, presenting the received information by means of a corresponding presentation tool according to the type of the target network resource or the data type and contents of the first response information, and generating the information of the image code format by projection according to presented contents); determining route information of the user portal corresponding to the first response according to a reverse route transmitted by the second access request; generating the second response information according to the contents of the second response information, and the route information; and generating the second response according to the second response information.

Solution 4: receiving a first response, and acquiring first response information; filtering contents harmful to the user portal or contents of sensitive or confidential information out of the first response information, and then converting the filtered response information to generate information of an image code format as contents of second response information; determining route information of the user portal corresponding to the first response according to a reverse route transmitted by the second access request; generating the second response information according to the contents of the second response information, and the route information; and generating the second response according to the second response information.

Figure 8:
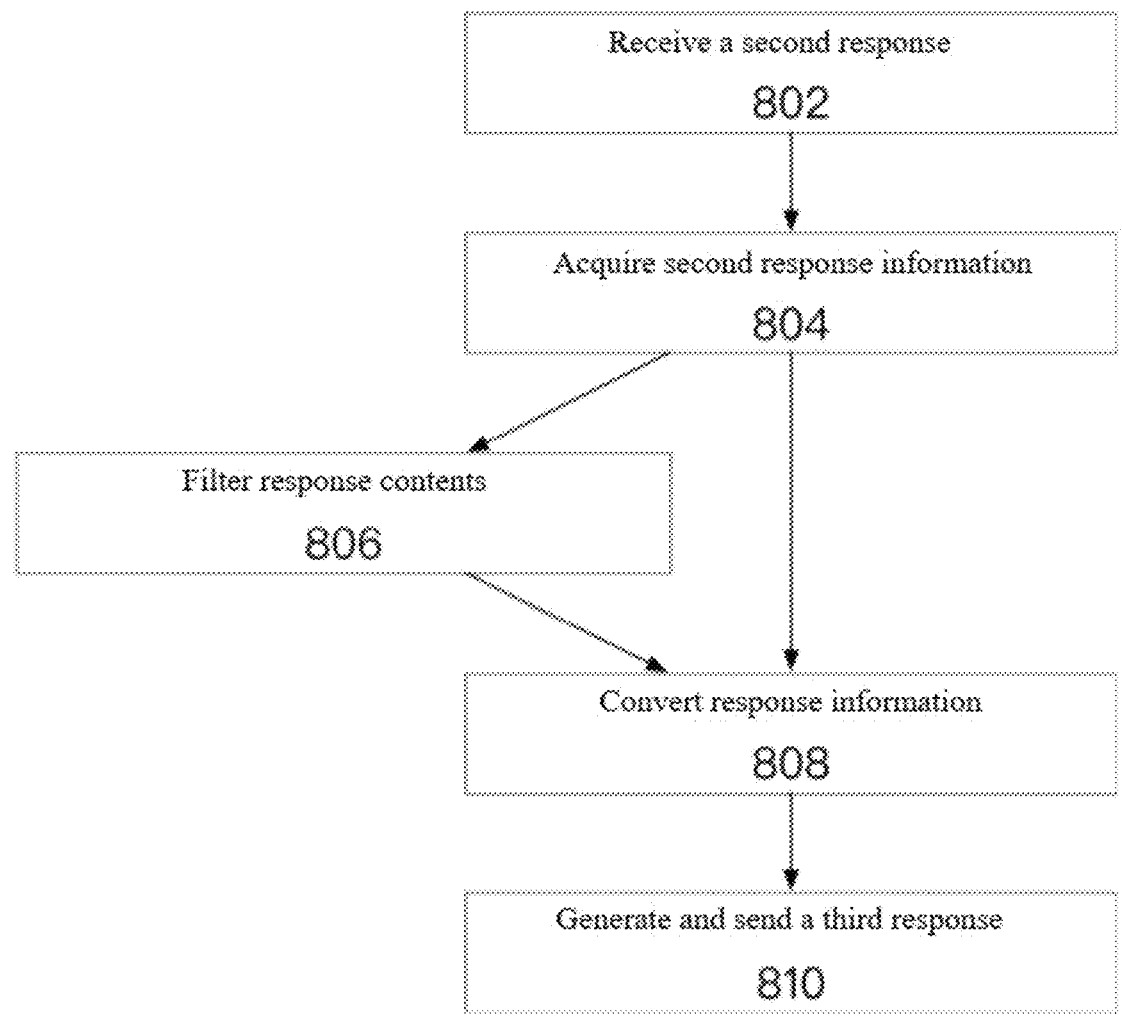
FIG. 8 is a step diagram for generating a third response according to the invention.

The network resource access method further comprises: receiving, by the user portal 1-B, a second response 110 returned by the resource portal 1-C, generating a third response 112 to the first access request 102 according to the second response (response conversion in Step 1-B3), and sending the third response 112 to the user terminal 1-A. As shown in FIG. 8, receiving a second response and generating a third response according to the second response (response conversion in Step 1-B3), specifically comprise:

802: receiving a second response 110 by a response receiver I 217 in the user portal 1-B;

804: acquiring second response information, and sending the second response information to a response converter I 213, by the response receiver I 217 in the user portal 1-B;

808: converting the response information by the response converter I 213: acquiring route information of the user terminal corresponding to the second response from user information 20A according to a reverse route transmitted by the first access request, generating third response information according to contents of the second response information, and the acquired route information (obtaining the third response information by adding attribute information such as a sender, a receiver or a content type to the contents of the second response information), and sending the third response information to a response transmitter I 211; and 810: packaging the third response information (for example, by adding information for network transmission such as a network communication transmission format, or conservation information) to generate a corresponding third response 112; and sending the third response 112 to the user terminal 1-A, by the response transmitter 1211.

The following solutions may be adopted for receiving a second response and generating a third response according to the second response:

Solution 1:

802: receiving a second response 110 by a response receiver I 217 in the user portal 1-B;

804: acquiring second response information, and sending the second response information to a content filter 1209, by the response receiver I 217 in the user portal 1-B;

806: filtering out contents harmful to the user terminal or contents of sensitive or confidential information, and sending the filtered information to a response converter I 213, by the content filter I 209;

808: converting the response information by the response converter I 213: acquiring route information corresponding to the user terminal corresponding to the second response from user information 20A according to a reverse route transmitted by the first access request, generating third response information according to contents of the filtered information, and the acquired route information (obtaining the third response information by adding attribute information such as a sender, a receiver or a content type to the contents of the filtered information), and sending the third response information to a response transmitter I 211; and 810: packaging the third response information (for example, by adding information for network transmission such as a network communication transmission format or conservation information) to generate a corresponding third response 112, and sending the third response 112 to the user terminal 1-A, by the response transmitter 1211.

Solution 2: receiving a second response, and acquiring second response information; converting the second response information to generate information of an image code format as contents of third response information (specifically, presenting the second response information by means of a corresponding presentation tool according to the type of the target network resource or the data type and contents of the first response information, and generating the information of the image code format by projection or drawing according to presented contents); determining route information of the user terminal corresponding to the second response according to a reverse route transmitted by the first access request; generating the third response information according to the contents of the third response information, and the route information; and generating the third response according to the third response information. Furthermore, by adoption of this solution, the step of generating information of the image code format may not be performed in the process of generating the second response according to the first response; similarly, in the process of generating a second response according to the first response, solution 2 may not be adopted in the process of generating the third response according to the second response under the premise of generating information of an image code format as contents of second response information.

Figure 9:
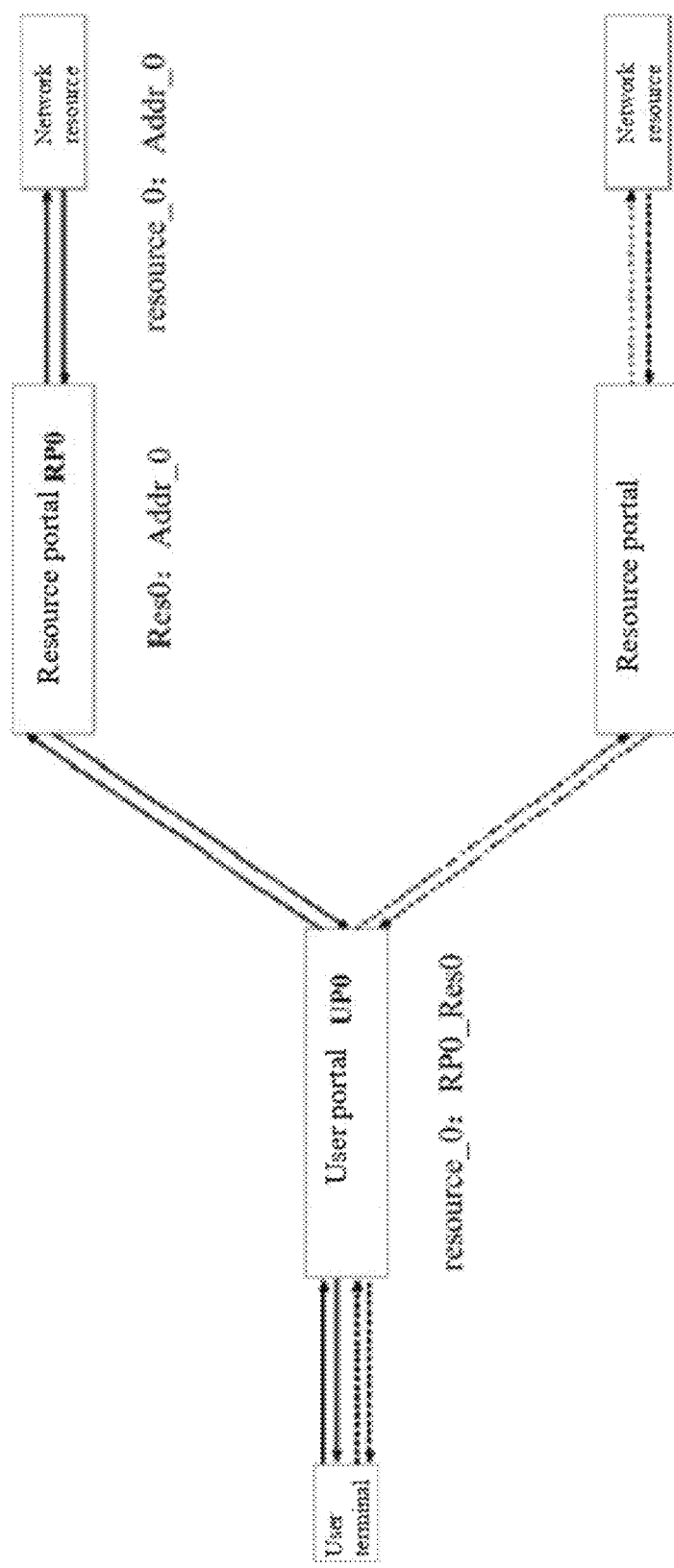
FIG. 9 is an illustrative diagram of a network resource access processing method according to the invention.

The specific implementation of the whole access process will be described below in conjunction with FIG. 9:

a, a user sends a first access request to a user portal UP0 by means of a user terminal to request to access a first network resource (resource_0);

b, after receiving the first access request, the user portal UP0 acquires route information RP0_Res0 of the first network resource according to a corresponding relationship between the first network resource (resource_0) and a resource portal (a first corresponding relationship), wherein resource_0: RP0_Res0 in FIG. 9 means that, for the user portal UP0, the user accesses the first network resource (resource_0) by means of RP0_Res0;

c, the user portal UP0 generates a second access request pointing to a resource portal RP0, and sends the second access request to the resource portal RP0 to request to access the first network resource (resource_0);

d, the resource portal RP0 receives the second access request, acquires an actual address Addr_0 and a resource type Web application of the first network resource (resource_0) according to a corresponding relationship between the first network resource (resource_0) and the resource portal RP0 (a second corresponding relationship), and logs in by means of a default account to access the first network resource (resource_0), wherein Res0: Addr_0 in FIG. 9 means that, for the resource portal RP0, the actual access address of the access request pointing to Res0 is Addr_0;

e, the resource portal RP0 invokes an explorer corresponding to the Web application (such as the Chrome explorer) to generate a third access request pointing to the first network resource (resource_0) with the address Addr_0 and completing the log-in logic by means of the default account, and sends the third access request to the first network resource resource_0 with the address Addr_0;

f, the first network resource resource_0 with the address Addr_0, returns a first response to the resource portal RP0;

g, after receiving the first response, the resource portal RP0 processes contents of the first response, generates a second response to the second access request, and sends the second response to the user portal UP0;

h, after receiving the second response, the user portal UP0 processes contents of the second response, generates a third response to the first access request, and sends the third response to the user terminal;

Processing in Step g and Step h comprises: presenting (rendering) the first response information or the second response information by means of a corresponding presentation tool (such as the Chrome explorer) according to the type of a target network resource or the data type and contents of the response information, generating information of an image code format by projection or drawing according to presented contents, and using the information of the image code format as contents of the second response information or third response information.

It is a picture of the network resource, that does not contain any actual information (such as the location or contents) of the network resource, rather than a true interface of the network resource that the user actually accesses (sees and operates), such that the network security is improved without affecting the actual experience of the user.

For the sake of a good understanding, the first corresponding relationship, namely the corresponding relationship between the first network resource (resource_0) and the resource portal, and the second corresponding relationship, namely the relationship between the first network resource (resource_0) and the resource portal RP0, in Step b and Step d are explained as follows:

The first corresponding relationship is a corresponding relationship between resource identifiers in the user portal and actual resource contents, and the second corresponding relationship is a corresponding relationship between resource identifiers in the resource portal and actual resource contents. For example, the user portal is in a communication connection with a resource portal RP1 and a resource portal RP2, the resource portal RP1 is associated with two network resources aa and ab, and the resource portal RP2 is also associated with two network resources aa and ab, so the accessible resource list of the user portal contains four network resources named res_1, res_2, res_3 and res_4, respectively. Wherein, the first corresponding relationship is as follows: res_1 corresponds to the resource aa accessed via the resource portal RP1; res_2 corresponds to the resource ab accessed via the resource portal RP1; res_3 corresponds to the resource aa accessed via the resource portal RP2; res_4 corresponds to the resource ab accessed via the resource portal RP2. The second corresponding relationship is as follows: in the resource portal RP1, res_1 corresponds to the resource aa, and res_2 corresponds to the resource ab; and in the resource portal RP2, res_3 corresponds to the resource aa, and res_4 corresponds to the resource ab.

This embodiments provides another network resource access processing method, which is applied to a user portal and comprises:

Initiating, by a user, a first access request 102 aiming at a target network resource by means of a user terminal 1-A (or by means of a network agent service), and transmitting the first access request 102 to a user portal 1-B, wherein the user portal 1-B acquires a list of resource portals, capable of communicating with the user portal, according to a configuration from an administrator or from a third-party, and uses a resource list associated with resource portals as an accessible resource list; and the user selects a target network resource, that the user is to access, from the accessible resource list of the user portal.

Receiving the first access request 102, generating a second access request 104 according to the first access request (request conversion in Step 1-B1), and then sending the second access request to a resource portal 1-C, by the user portal 1-B, wherein the specific implementation may be understood with reference to the specific steps of receiving a first access request and generating a second access request according to the first access request, and will no longer be detailed here; and Receiving, by the user portal 1-B, a second response 110 returned by the resource portal 1-C, generating a third response 112 to the first access request according to the second response (response conversion in Step 1-B3), and sending the third response to the user terminal 1-A, wherein the second response is a response to the second access request, and the specific implementation may be understood with reference to the specific steps of receiving a second response and generating a third response according to the second response, and will no longer be detailed here.

The invention further provides a user portal, comprising a memory and a processor that are in a communication connection, and a computer program stored in the memory and to be run on the processor, wherein when the computer program is run by the processor, the network resource access processing method applied to a user portal is implemented.

This embodiment provides another network resource access processing method, which is applied to a resource portal and comprises:

Acquiring, by a resource portal 1-C, resource information associated with the resource portal according to a configuration from an administrator or from a third party, as well as a list of user portals capable of communicating with the resource portal, receiving a second access request 104 sent from a user portal in the list of user portals, generating a third access request 106 according to the second access request (request conversion in Step 1-C1), and then sending the third access request 106 to a target network resource server 1-D, wherein the specific implementation may be understood with reference to the specific steps of receiving a second access request and generating a third access request according to the second access request, and will no longer be detailed here;

Receiving, by the resource portal 1-C, a first response 108 to the third access request from the target network resource server 1-D, generating a second response 110 to the second access request 104 according to the first response (response conversion in Step 1-C3), and sending the second response 110 to the user portal 1-B, wherein the specific implementation may be understood with reference to the specific steps of receiving a first response and generating a second response according to the first response, and will no longer be detailed here.

The invention further provides a resource portal, comprising a memory and a processor that are in a communication connection, and a computer program stored in the memory and to be run on the processor, wherein when the computer program is run by the processor, the network resource access processing method applied to a resource portal is implemented.

What is claimed is:

1. A network resource access system, comprising a user portal and a resource portal that are in a first communication connection, wherein:
the user portal comprises a first memory and a first processor that are in a second communication connection, and a first computer program stored in the first memory and to be run on the first processor, wherein the first computer program, when run by the first processor, causes the user portal to:
acquire a list resource portals capable of communicating with the user portal according to a first configuration from an administrator or from a third party, use a resource list associated with resource portals as an accessible resource list, and receive a first access request initiated by a user by means of a user terminal and aiming at a target network resource in the accessible resource list, generate a second access request according to the first access request, and then send the second access request to the resource portal;
and wherein the resource portal comprises a second memory and a second processor that are in a third communication connection, and a second computer program stored in the second memory and to be run on the second processor, wherein the second computer program, when run by the second processor, causes the resource portal to:
acquire resource information associated with the resource portal according to a second configuration from the administrator or from the third party, as well as a list of user portals capable of communicating with the resource portal; and receive the second access request sent from the user portal in the list of user portals; generate a third access request according to the second access request, and then send the third access request to a target network resource server;
wherein receiving the second access request and generating the third access request according to the second access request specifically comprise:
receiving the second access request, and acquiring a second-access-request information; discarding other access request information beyond user portal permissions from the second-access-request information, then determining one or more items of an actual address, a request method and a processing logic of the target network resource corresponding to the second access request according to a second corresponding relationship determined by configurations embedded in the network resource access system, from the administrator or from the third-party, and converting the second-access-request information, obtained after the other access request information beyond the user portal permissions is discharged, according to the determined one or more items to generate a third-access-request information; and generating the third access request according to the third-access-request information;
or,
receiving the second access request, and acquiring a second-access-request information; filtering contents harmful to the resource portal or the target network resource or contents of sensitive or confidential information out of the second-access-request information, then determining one or more items of an actual address, a request method and a processing logic of the target network resource corresponding to the second access request according to a second corresponding relationship determined by configurations embedded in the network resource access system, from the administrator or from the third-party, and converting filtered access request information according to the determined one or more items to generate a third-access-request information; and generating the third access request according to the third-access-request information.

2. The network resource access system according to claim 1, wherein:
the resource portal is also used for receiving a first response to the third access request returned by the target network resource server, generating a second response to the second access request according to the first response, and sending the second response to the user portal;
the user portal is also used for receiving the second response returned by the resource portal, generating a third response to the first access request according to the second response, and sending the third response to the user terminal.

3. The network resource access system according to claim 1, wherein receiving the first access request and generating the second access request according to the first access request specifically comprise:
receiving the first access request, and acquiring a first-access-request information; determining a resource portal and a route information corresponding to the target network resource corresponding to the first access request according to a first corresponding relationship determined by configurations embedded in the network resource access system, from the administrator or from the third-party, and converting the first-access-request information according to the determined information to generate the second-access-request information; and generating the second access request according to the second-access-request information;
or, receiving the first access request, and acquiring a first-access-request information; checking a validity of the first-access-request information, and discarding illegal request information from the first-access-request information; determining a resource portal and a route information corresponding to the target network resource corresponding to the first access request according to a first corresponding relationship determined by configurations embedded in the network resource access system, from the administrator or from a third-party, and converting the first-access-information, obtained after the illegal request information is discarded, according to the determined information to generate the second-access-request information; and generating the second access request according to the second-access-request information;
or, receiving the first access request, and acquiring a first-access-request information; discarding the other access request information beyond user permissions from the first-access-request information, then determining a resource portal and a route information corresponding to the target network resource corresponding to the first access request according to a first corresponding relationship determined by configurations embedded in the network resource access system, from the administrator or from the third-party, and converting the first-access-request information, obtained after the other access request information beyond the user permissions is discarded, according to the determined information to generate the secondaccess-request information; and generating the second access request according to the second-access-request information;

or, receiving the first access request, and acquiring a first-access-request information; discarding the other access request information beyond user portal permissions from the first-access-request information, then determining a resource portal and a route information corresponding to the target network resource corresponding to the first access request according to a first corresponding relationship determined by configurations embedded in the network resource access system, from the administrator or from the third-party, and converting the first-access-request information, obtained after the other access request information beyond the user portal permissions is discarded, according to the determined information to generate the second-access-request information; and generating the second access request according to the second-access-request information;

or, receiving the first access request, and acquiring a first-access-request information; filtering contents harmful to the resource portal or the target network resource or contents of sensitive or confidential information out of the first-access-request information, then determining a resource portal and a route information corresponding to the target network resource corresponding to the first access request according to a first corresponding relationship determined by configurations embedded in the network resource access system, from the administrator or from the third-party, and converting filtered access request information according to the determined information to generate the second-access-request information; and generating the second access request according to the second-access-request information.

4. The network resource access system according to claim 2, wherein receiving the first response and generating the second response according to the first response specifically comprise:

receiving the first response, and acquiring a first response information; determining a route information of a user portal corresponding to the first response according to a reverse route transmitted by the second access request; generating a second response information according to contents of the first response information and the route information; and generating the second response according to the second response information;

or, receiving the first response, and acquiring a first response information; converting the first response information to generate information of an image code format as contents of a second response information; determining a route information of the user portal corresponding to the first response according to a reverse route transmitted by the second access request; generating the second response information according to the contents of the second response information, and the route information; and generating the second response according to the second response information;

or, receiving the first response, and acquiring a first response information; filtering contents harmful to the user portal or contents of sensitive or confidential information out of the first response information, and then converting filtered response information to generate information of an image code format as contents of a second response information; determining a route information of the user portal corresponding to the first response according to a reverse route transmitted by the second access request; generating the second response information according to the contents of the second response information and the route information; and generating the second response according to the second response information;

or, receiving the first response, and acquiring a first response information; checking a validity of the first response information, and discarding illegal response information from the first response information; converting information, obtained after the illegal response information is discarded, to generate information of an image code format as contents of a second response information; determining a route information of the user portal corresponding to the first response according to a reverse route transmitted by the second access request; generating the second response information according to the contents of the second response information and the route information; and generating the second response according to the second response information.

5. The network resource access system according to claim 4, wherein converting the first response information or converting the filtered response information or converting information obtained after the illegal response information is discarded, to generate information of the image code format as the contents of the second response information specifically comprises:

presenting the first response information by means of a corresponding presentation tool according to a type of the target network resource or a data type and contents of the first response information, and generating the information of the image code format by projection or drawing according to presented contents;

or, presenting the filtered response information by means of a corresponding presentation tool according to a type of the target network resource or a data type and contents of the first response information, and generating the information of the image code format by projection or drawing according to presented contents;

or, presenting the information; obtained after the illegal response information is discarded, by means of a corresponding presentation tool according to a type of the target network resource or a data type and contents of the first response information, and generating the information of the image code format by projection or drawing according to presented contents.

6. The network resource access system according to claim 2, wherein receiving the second response and generating the third response according to the second response specifically comprise:

receiving the second response, and acquiring a second response information; determining a route information of the user terminal corresponding to the second response according to a reverse route transmitted by the first access request; generating a third response information according to contents of the second response information and the route information; and generating the third response according to the third response information;

or, receiving the second response, and acquiring a second response information; filtering contents harmful to the user terminal or contents of sensitive or confidential information out of the second response information, and then determining a route information of the user terminal corresponding to the second response according to a reverse route transmitted by the first access request; generating a third response information according to contents of filtered response information; and the route information; and generating the third response according to the third response information;

or, receiving the second response, and acquiring a second response information; converting the second response information to generate information of an image code format as contents of a third response information; determining a route information of the user terminal corresponding to the second response according to a reverse route transmitted by the first access request; generating the third response information according to the contents of the third response information; and the route information; and generating the third response according to the third response information.

7. The network resource access system according to claim 6, wherein converting the second response information to generate the information of the image code format; specifically comprises:

presenting the second response information by means of a corresponding presentation tool according to a type of the target network resource or a data type and contents of the first response information, and generating the information of the image code format by projection or drawing according to presented contents.

8. The network resource access system according to claim 1, wherein:

the user portal sends an access request only to a resource portal capable of establishing the first communication connection with the user portal, and determines whether to send the access request according to whether a current state of the resource portal is normal; and/or the user portal sends a response only to a resource portal capable of establishing the first communication connection with the user portal, and determines whether to receive the response according to whether a current state of the resource portal is normal; and/or the resource portal only receives an access request sent from a user portal capable of establishing the first communication connection with the resource portal, and determines whether to receive the access request according to whether a current state of the user portal is normal; and/or the resource portal sends a resource list and/or response only to a user portal capable of establishing the first communication connection with the resource portal, and determines whether to send the resource list and/or response according to whether a current state of the user portal is normal; and/or the user portal is also used for managing user information and verifying the user permissions; and/or the resource portal is also used for managing resource information and monitoring a resource state.

9. The network resource access system according to claim 2, wherein receiving the first access request and generating the second access request according to the first access request specifically comprise:

receiving the first access request, and acquiring a first-access-request information; determining a resource portal and a route information corresponding to the target network resource corresponding to the first access request according to a first corresponding relationship determined by configurations embedded in the network resource access system, from the administrator or from the third-party, and converting the first-access-request information according to the determined information to generate the second-access-request information; and generating the second access request according to the second-access-request information;

or, receiving the first access request, and acquiring a first-access-request information; checking a validity of the first-access-request information, and discarding illegal request information from the first-access-request information; determining a resource portal and a route information corresponding to the target network resource corresponding to the first access request according to a first corresponding relationship determined by configurations embedded in the network resource access system, from the administrator or from the third-party, and converting the first-access-request information, obtained after the illegal request information is discarded, according to the determined information to generate the second-access-request information; and generating the second access request according to the second-access-request information;

or, receiving the first access request, and acquiring a first-access-request information; discarding other access request information beyond user permissions from the first-access-request information, then determining a resource portal and a route information corresponding to the target network resource corresponding to the first access request according to a first corresponding relationship determined by configurations embedded in the network resource access system, from the administrator or from the third-party, and converting the first-access-request information, obtained after the other access request information beyond the user permissions is discarded, according to the determined information to generate the second-access-request information; and generating the second access request according to the second-access-request information;

or, receiving the first access request, and acquiring a first-access-request information; discarding other access request information beyond user portal permissions from the first-access-request information, then determining a resource portal and a route information corresponding to the target network resource corresponding to the first access request according to a first corresponding relationship determined by configurations embedded in the network resource access system, from the administrator or from the third-party, and converting the first-access-request information, obtained after the other access request information beyond the user portal permissions is discarded, according to the determined information to generate the second access request information; and generating the second access request according to the second-access-request information;

or, receiving the first access request, and acquiring a first access request information; filtering contents harmful to the resource portal or the target network resource or contents of sensitive or confidential information out of the first-access-request information, then determining a resource portal and a route information corresponding to the target network resource corresponding to the first access request according to a first corresponding relationship determined by configurations embedded in the network resource access system, from the administrator or from the third-party, and converting filtered access request information according to the determined information to generate second-access-request information; and generating the second access request according to the second-access-request information.

\* \* \* \* \*